United States Patent [19]
Koyano et al.

[11] Patent Number: 5,462,341
[45] Date of Patent: Oct. 31, 1995

[54] PROPORTIONING VALVE

[75] Inventors: Hitoshi Koyano; Shozo Sakaguchi, both of Higashimatsuyama, Japan

[73] Assignee: Jidosha Kiki Co., Ltd., Tokyo, Japan

[21] Appl. No.: 217,875

[22] Filed: Mar. 25, 1994

[30] Foreign Application Priority Data

Apr. 9, 1993 [JP] Japan ................................. 5-082952
Oct. 27, 1993 [JP] Japan ................................. 5-268528

[51] Int. Cl.⁶ ................................................... B60T 8/26
[52] U.S. Cl. ..................... 303/9.75; 303/22.8; 137/493.9; 137/508
[58] Field of Search ................... 303/9.75, 9.76, 303/115.1, 116.2, 117.1, 22.8, 33, 45, 84.1, 84.2, DIG. 1, DIG. 2, 901; 137/493.9, 508; 251/337

[56] References Cited

U.S. PATENT DOCUMENTS

| 4,324,271 | 4/1982 | Lüpertz | 137/493.9 X |
| 4,428,396 | 1/1984 | Wall | 137/493.9 |
| 5,052,759 | 10/1991 | Tanaka | 251/337 X |
| 5,322,354 | 6/1994 | Yamakoshi | 303/9.75 X |

FOREIGN PATENT DOCUMENTS

4827/1975   2/1975   Japan .
2175071   11/1986   United Kingdom ............... 303/9.75

*Primary Examiner*—Josie A. Ballato
*Attorney, Agent, or Firm*—Jacobson, Price, Holman & Stern

[57] ABSTRACT

A proportioning valve including an annular piston (3) slidably fitted into a cylinder bore (2), a valve seat (6) disposed on the piston (3), and a second spring (5) installed in an output pressure chamber (10) so that the piston is positioned at a predetermined position.

4 Claims, 7 Drawing Sheets

PROPORTIONING VALVE

BACKGROUND OF THE INVENTION

The present invention relates to a proportioning valve.

FIGS. 7 and 8 show a conventional proportioning valve.

In this proportioning valve 20, a fluid supplied from a master cylinder, etc. to an input pressure chamber 21 through an input port 21a is supplied to an output pressure chamber 24 through a space between a valve element 22a of a plunger 22 and a valve seat 23 as shown by solid-line arrows in FIG. 8, and then sent under pressure to a wheel cylinder, etc. through an output port 24a. When the pressure in the output pressure chamber 24 reaches a predetermined value, the differential pressure acting on the plunger 22 operates the plunger 22 against the energizing force of a spring 25, so that the valve element 22a of the plunger 22 abuts against the valve seat 23, thereby the output pressure chamber 24 being isolated from the input pressure chamber 21 (point A on the characteristic curve in FIG. 9). Then, when the pressure in the input pressure chamber 21 is increased, the valve element 22a of the plunger 22 separates again from the valve seat 23, so that the fluid in the input pressure chamber 21 is sent under pressure into the output pressure chamber 24. When the pressure in the output pressure chamber 24 reaches a predetermined value with respect to the pressure in the input pressure chamber 21, the valve element 22a of the plunger 22 abuts against the valve seat 23, by which the output pressure chamber 24 is isolated from the input pressure chamber 21. By repeating this operation, the output pressure is increased (characteristic line ACB in FIG 9).

This proportioning valve is provided with a check valve mechanism in addition to the above-described stop valve mechanism. This check valve mechanism is formed of a lip 23a of the valve seat 23. When the pressure in the output pressure chamber 24 becomes higher than the pressure in the input pressure chamber 21, the check valve mechanism returns the fluid in the output chamber 24 to the input pressure chamber 21.

However, between points A and B on the characteristic curve, the pressure in the input pressure chamber 21 is always higher than the pressure in the output pressure chamber 24, so that a state in which the valve element 22a abuts against the valve seat 23 is kept. Therefore, when the depressing force of master cylinder is gradually released, that is, when the pressure in the input pressure chamber 21 is gradually decreased, the plunger 22 rises slightly by deforming the valve seat 23, by which the volume of the output pressure chamber 24 is slightly increased. As a result, the pressure in the output pressure chamber 24 decreases slightly.

With the proportioning valve of this type, when the brake is released gradually, the pressure in the output pressure chamber 24 cannot respond quickly to the decrease in pressure in the input pressure chamber 21 as described above. Therefore, hysteresis occurs as indicated by CDA on the characteristic curve in FIG. 9.

Such a phenomenon is not undesirable particularly when an anti-skid control brake is used.

BRIEF SUMMARY OF THE INVENTION

Accordingly, an object of the present invention is to provide a proportioning valve in which the decrease in pressure in an output pressure chamber is fully effected when the brake is released, that is, hysteresis is eliminated.

The proportioning valve of the present invention comprises a valve seat disposed in a cylinder bore of a housing and a valve body disposed on a plunger, which define an input pressure chamber and an output pressure chamber in the cylinder bore, and a first spring for energizing the plunger to keep the valve open when the pressure in the output pressure chamber is lower than a predetermined pressure, wherein an annular piston is slidably fitted into the cylinder bore, the valve seat is disposed on the piston, and a second spring is installed in the output pressure chamber to energize the piston toward the input pressure chamber so that the piston is positioned at a predetermined position, by which the valve body abuts against the valve seat when the pressure in the input pressure chamber is increased, and then the piston moves toward the output pressure chamber against the energizing force of the second spring when the pressure in the input pressure chamber is further increased, and the piston returns when the pressure in the input pressure chamber is decreased.

With the proportioning valve of the present invention, when the pressure in the input pressure chamber is increased, for example, upon brake application, a fluid in the input pressure chamber is supplied to the output pressure chamber from the initial stage until a predetermined pressure is reached. When the pressure in the input pressure chamber reaches the predetermined value, the plunger is operated to close the valve. When the pressure in the input pressure chamber is further increased, the increased pressure allows the piston to move against the energizing force of the second spring. When the pressure in the input pressure chamber is decreased, for example, upon brake releasing, the piston returns to the initial condition by following the reverse procedure.

The pressures in the input pressure chamber and the output pressure chamber increase while being kept at an almost equal value until the valve is closed. Thereafter, the pressure in the output pressure chamber is increased to a pressure depending on the spring constant of the second spring (a pressure lower than the pressure in the input pressure chamber at a fixed ratio). When the pressure in the input pressure chamber is decreased, the pressure in the output pressure chamber also decreases while keeping the aforesaid ratio until the pressure in the input pressure chamber reaches the predetermined value. When the valve is opened, the pressure in the output pressure chamber becomes almost equal to the pressure in the input pressure chamber.

As described above, according to the proportioning valve of the present invention, the pressure in the output pressure chamber is increased and decreased by the contraction and expansion of the volume of the output pressure chamber, so that the response is high and hysteresis scarcely occurs.

BRIEF DESCRIPTION OF THE DRAWINGS

The invention will now be described in detail with reference to the accompanying drawings, wherein.

DETAILED DESCRIPTION OF PREFERRED EMBODIMENTS

Figure 1:
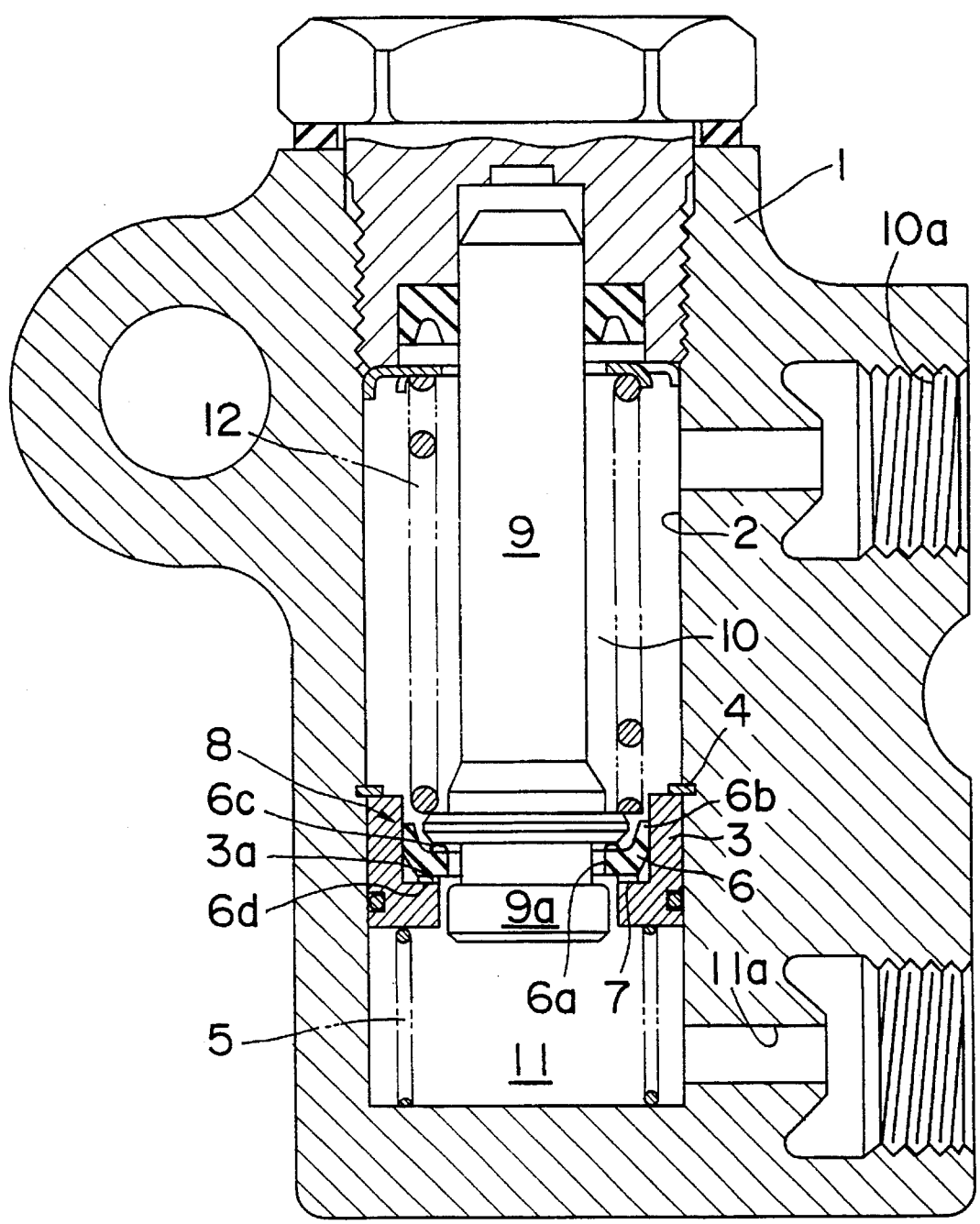
FIG. 1 is a cross-sectional view showing a proportioning valve in accordance with the present invention.

FIG. 1 shows a proportioning valve in accordance with the present invention.

This proportioning valve has a cylinder bore 2 formed in a housing 1. A free piston 3 is disposed in the cylinder bore 2, and a stop 4 is installed above the free piston 3. The free piston 3 is energized upward by a spring (a second spring) 5 disposed under the free piston 3 so as to abut against the stop 4. Thus, the free piston 3 is kept at the intermediate position of the cylinder bore 2.

The aforesaid free piston 3 has a valve seat 6. This valve seat 6 is formed of a cup packing, having a seat portion 6a at the inner periphery and a lip 6b at the outer periphery. The valve seat 6 has protrusions 6c and 6d which are disposed at substantially equal intervals in the circumferential direction on the upper and lower end surfaces, respectively. The protrusions 6d of the valve seat 6 are in contact with the step portion 3a of the free piston 3 to provide a return passage 7 between the step portion 3a and the valve seat 6, and the lip 6b of the valve seat 6 is in contact with the inner peripheral surface of the free piston 3, by which a check valve 8 is formed.

In the aforesaid cylinder bore 2, a plunger 9 is disposed, passing through the seat portion 6a of the valve seat 6. The plunger 9 has a valve body 9a. The valve body 9a, which is positioned below the valve seat 6, separates the cylinder bore 2 into an input pressure chamber 10 and an output pressure chamber 11 by abutting against the seat portion 6a of the valve seat 6. The input pressure chamber 10 is connected to, for example, a master cylinder through an input port 10a, whereas the output pressure chamber 11 is connected to, for example, a wheel cylinder through an output port 11a.

The plunger 9 is energized in the downward direction in FIG. 1 by a spring (a first spring) 12.

Figure 2:
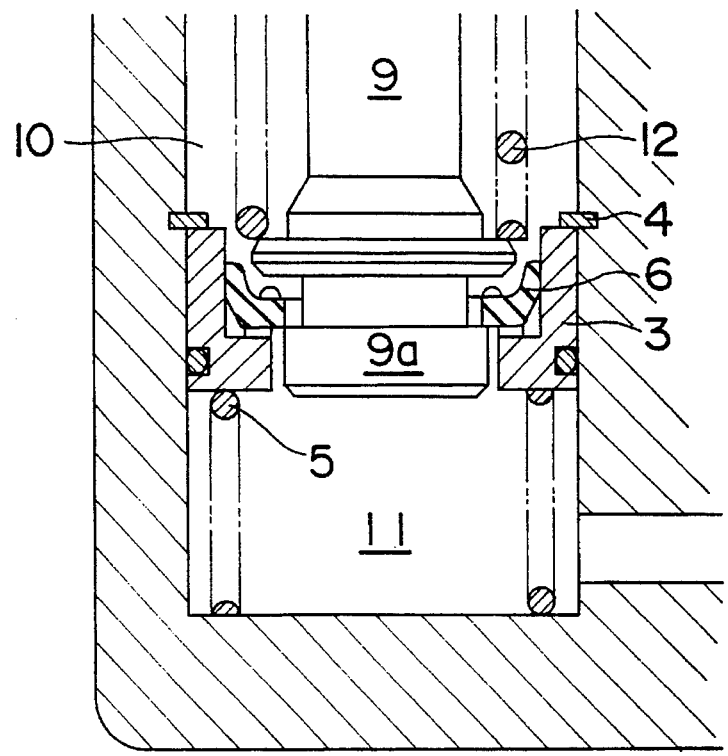
FIG. 2 is an enlarged partial cross-sectional view showing the main part of the proportioning valve of FIG. 1 in a state in which the valve body abuts against a valve seat.
Figure 3:
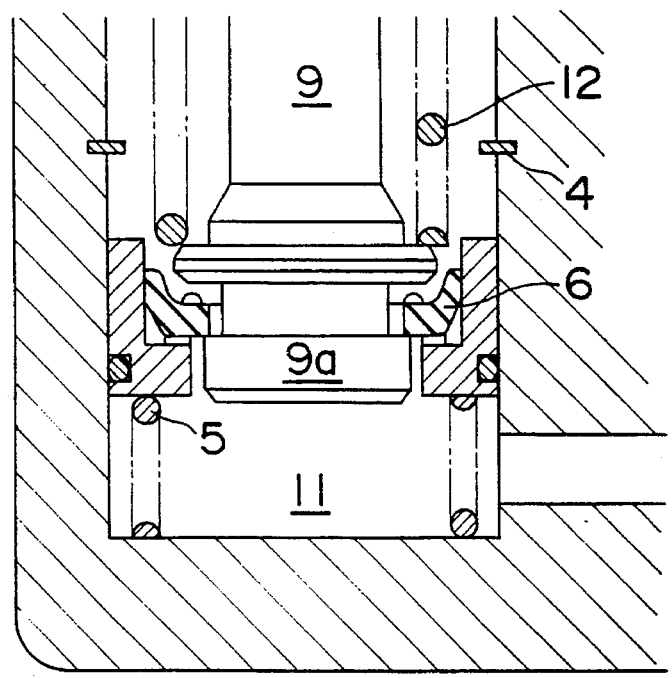
FIG. 3 is a view similar to FIG. 2 showing a state in which a free piston is operated.

With this proportioning valve, when the master cylinder, etc. is operated, a fluid in the master cylinder is supplied to the input pressure chamber 10 through the input port 10a, to the output pressure chamber 11 after passing through the space between the valve seat 6 and the valve body 9a, and to the wheel cylinder, etc. through the output port 11a. When the pressure in the output pressure chamber 11 reaches a predetermined value, the plunger moves upward while compressing the spring 12, so that the valve body 9a abuts against the valve seat 6 as shown in FIG. 2. Until this condition is encountered, the pressure in the output pressure chamber 11 is almost equal to the pressure in the input pressure chamber. When the fluid is further supplied to the input pressure chamber 10 and the pressure of the input pressure chamber 10 is increased, the piston 3 together with the plunger 9 is pushed down while compressing the spring 5 as shown in FIG. 3. In this condition, the pressure in the output pressure chamber 11 is a pressure decreased at a fixed ratio with respect to the pressure in the input pressure chamber 10. This ratio depends on the spring constant of the spring 5.

Specifically, when the pressure in the input pressure chamber 10 is further increased after the valve body 9a of the plunger 9 abuts against the valve seat 6, the volume of the output pressure chamber 11 is decreased while the valve closed condition is kept, so that the pressure in the output pressure chamber 11 is increased. The increase in pressure in the output pressure chamber 11 during this period of time is accomplished by the change in volume of the output pressure chamber 11.

When the operating force of the master cylinder, etc. is released, the pressure in the input pressure chamber 10 is decreased. As shown in FIG. 2, the piston 3 together with the plunger 9 moves upward while the valve body 9a abuts against the valve seat 6. Therefore, the volume of the output pressure chamber 11 is increased, so that the fluid in the wheel cylinder is returned to the output pressure chamber 11. The change in pressure in the output pressure chamber 11 during this period of time is accomplished by the change in volume in the output pressure chamber 11.

When the pressure in the input pressure chamber 10 is further decreased, the valve body 9a of the plunger 9 is separated from the valve seat 6 by the energizing force of the spring 12. Therefore, the fluid in the output pressure chamber 11 is returned to the input pressure chamber 10 by passing through the space between the valve body 9a and the valve seat 6.

With the proportioning valve of the present invention, the valve body 9a abuts against the valve seat 6 to close the valve as the pressure in the input pressure chamber 10 is increased. Until the valve is closed, the plunger 9 is subjected to an upward force due to the difference in pressure receiving area of the plunger 9. When this upward force overcomes the energizing force of the first spring 12, the plunger 9 moves upward, so that the valve is closed. Thereafter, the free piston 3 together with the plunger 9 is operated, while the valve is closed, in the direction such that the volume of the output pressure chamber 11 is decreased. During this period of time, the proportioning action is produced. The pressure decreasing ratio is determined by the spring constant of the spring 5. In this embodiment, the pre-setting load of the spring 5 can be set arbitrarily because the stop 4 is provided.

FIG. 1 of the above embodiment shows an ordinary proportioning valve, but, needless to say, the present invention can be applied to a load-sensing proportioning valve.

Figure 4:
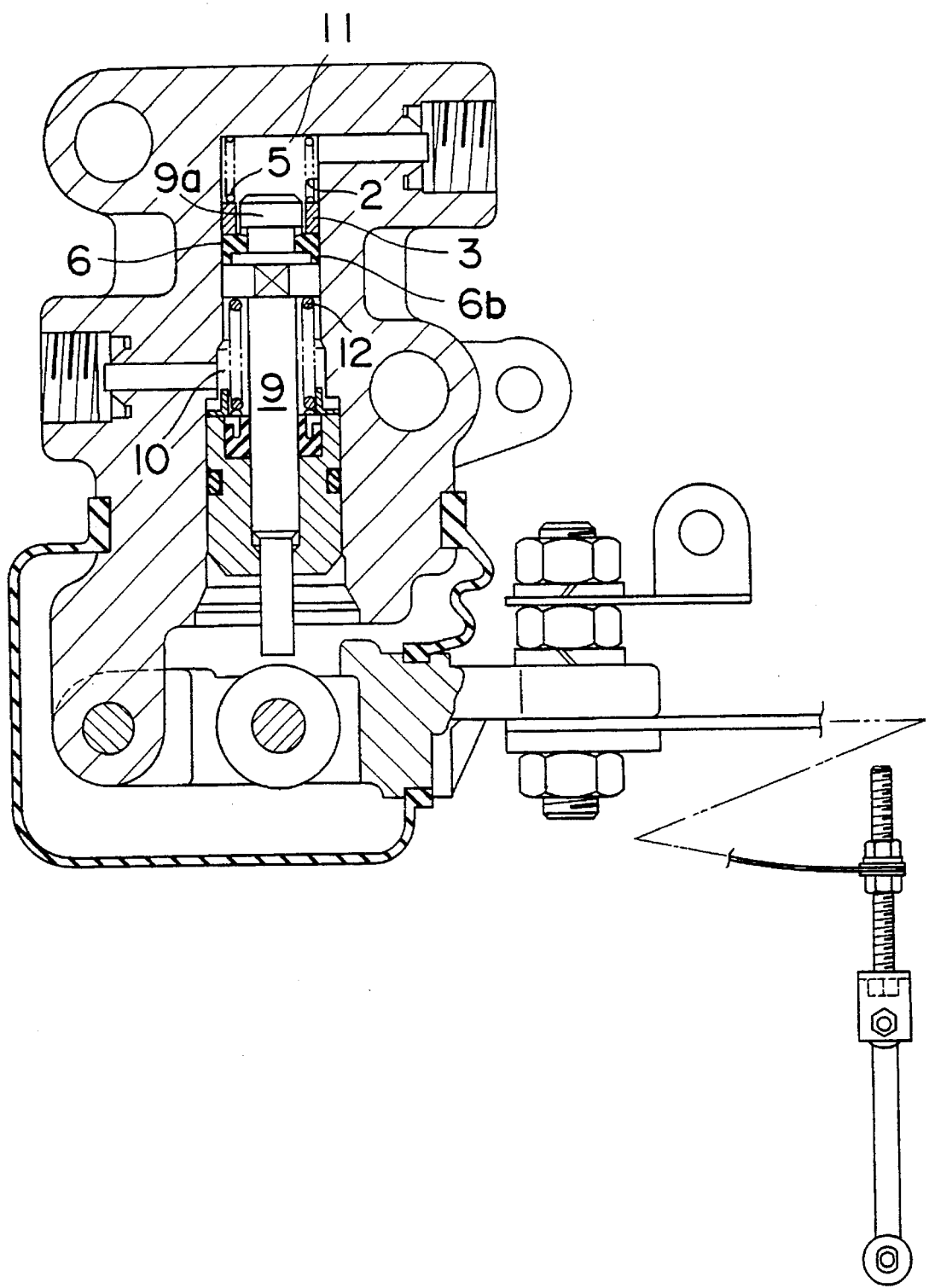
FIG. 4 is a cross-sectional view showing another embodiment of a proportioning valve in accordance with the present invention.

FIG. 4 shows an embodiment wherein the present invention is applied to a load-sensing proportioning valve in an automobile.

In this proportioning valve, the valve seat 6 is disposed on the end surface of the free piston 3, and the lip 6b is in contact with the cylinder bore 2. Therefore, this proportioning valve need not have a sealing member such as an O-ring installed between the free piston 3 and the cylinder bore 2, so that the construction can be made simple. Also, this proportioning valve has a low pre-setting load of the spring 12 and large spring constant of the spring 5. Therefore, the free piston 3 is positioned so that the spring 5 substantially has its free length, so that the stop 4 is unnecessary. Other construction is almost the same as that of the proportioning valve shown in FIG. 1, and the operation is substantially the same; therefore, the explanation is omitted.

Figure 5:
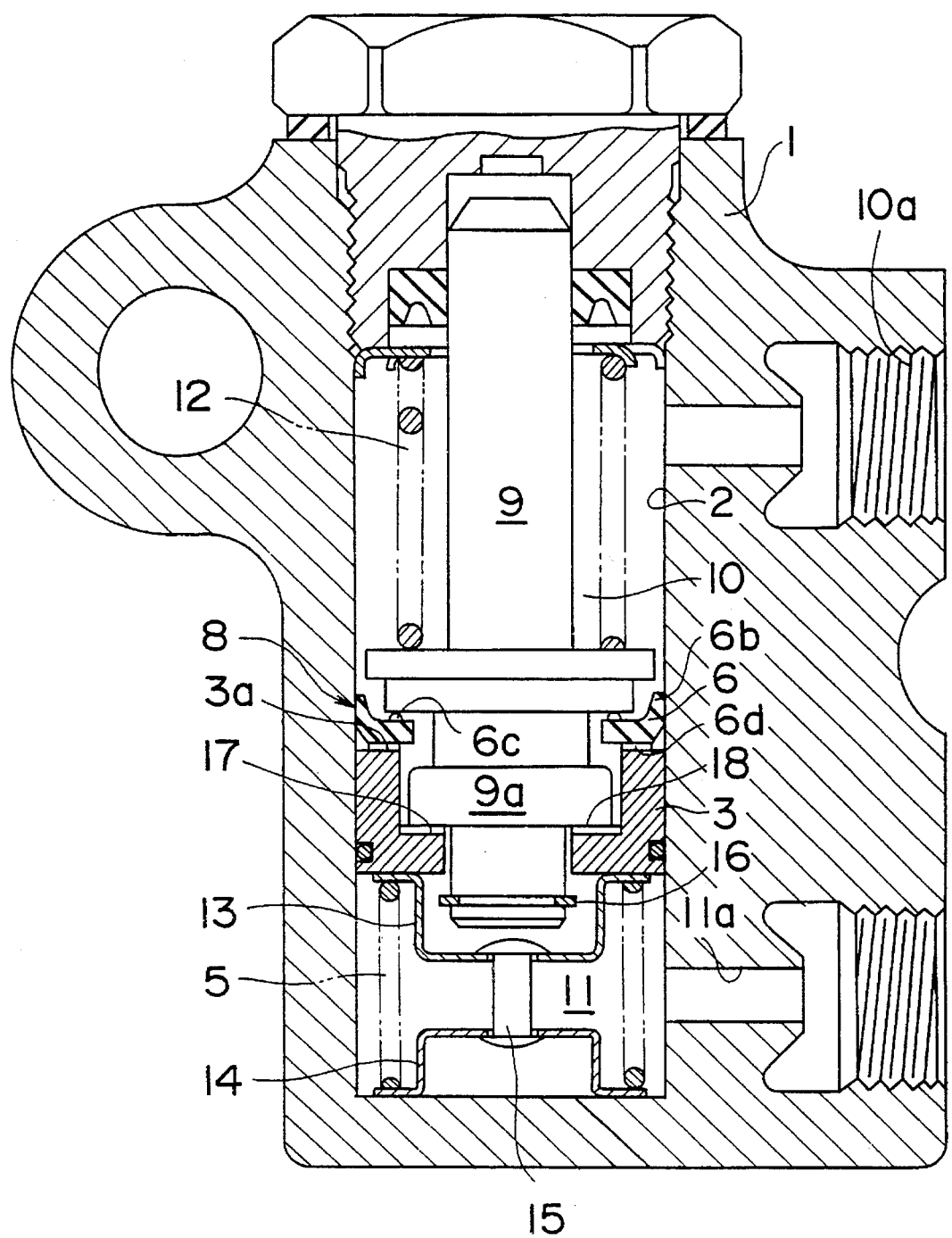
FIG. 5 is a cross-sectional view showing still another embodiment of a proportioning valve in accordance with the present invention.

FIG. 5 shows still another embodiment of the present invention.

In this embodiment, like the embodiment shown in FIG. 4, the valve seat 6 is disposed on the end surface of the free piston 3, and the lip 6b is in contact with the cylinder bore 2.

Therefore, the proportioning valve of this embodiment need not have a sealing member such as an O-ring installed between the free piston 3 and the cylinder bore 2, so that the construction can be made simple.

Moreover, the proportioning valve of this embodiment has a retainer 13 interposed between one end of the spring 5 and the end surface of the free piston 3 and a retainer 14 interposed between the other end of the spring 5 and the inner end surface of the output pressure chamber 11. These retainers 13 and 14 are connected by a connecting member 15 so that the retainers 13 and 14 are separated from one another with a fixed space between them. Thus, the retainers 13 and 14 and the connecting member 15 of the proportioning valve of this embodiment keep the spring 5 at a fixed length.

Therefore, the retainer assembly of the proportioning valve of this embodiment, like the stop 4 in the proportioning valve shown in FIG. 1, enables the spring 5 to be disposed in the condition in which the energizing force is accumulated in the spring 5, that is, under a desired presetting load.

Further, the proportioning valve of this embodiment has a stop consisting of a snap ring 16 fitted at the tip end of the plunger 9. The distance between the snap ring 16 and the free piston 3 is set so that this distance is slightly larger than the distance between the valve body 9a and the valve seat 6 in the state shown in FIG. 5.

Figure 6:
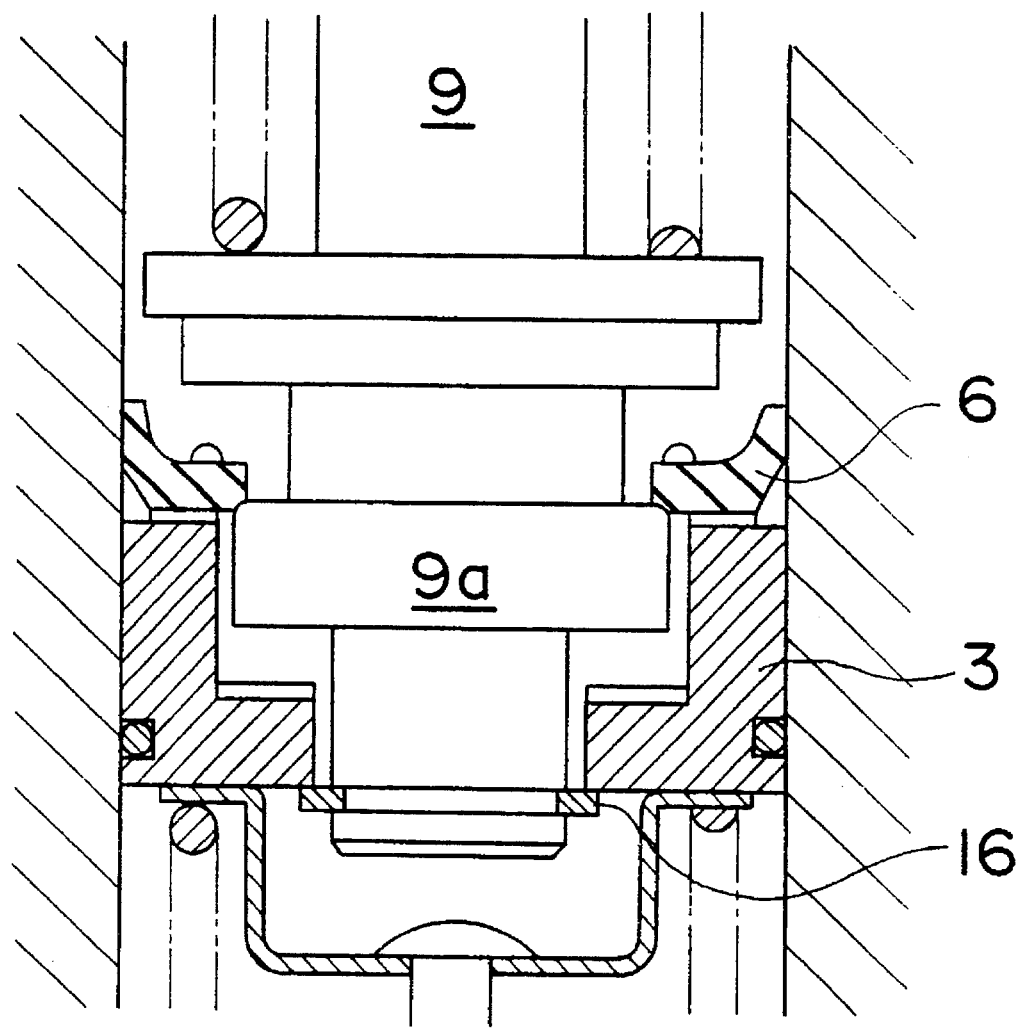
FIG. 6 is a partial enlarged cross-sectional view showing the operating condition of the proportioning valve shown in FIG. 5.
Figure 7:
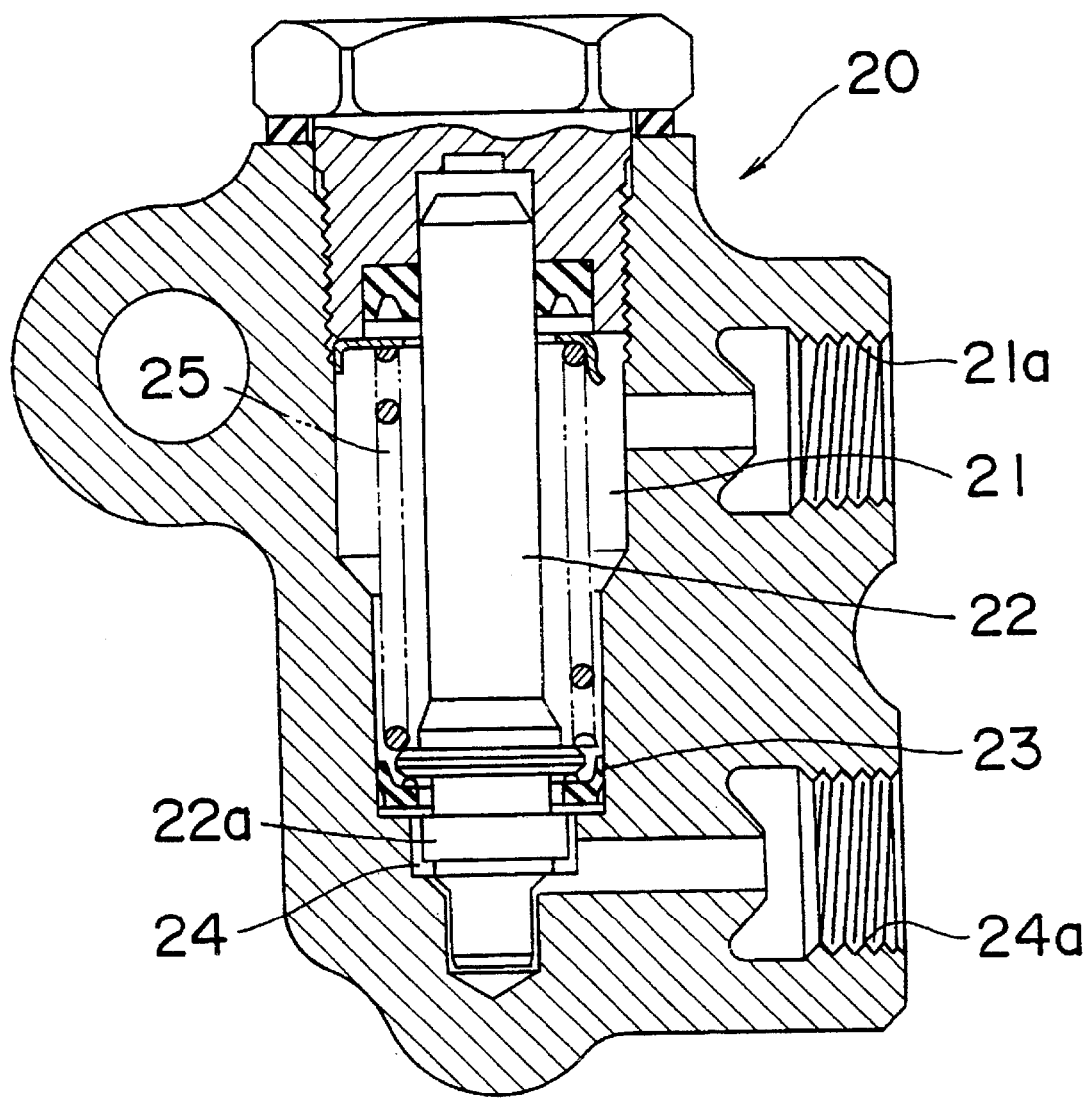
FIG. 7 is a cross-sectional view showing a proportioning valve used conventionally.
Figure 8:
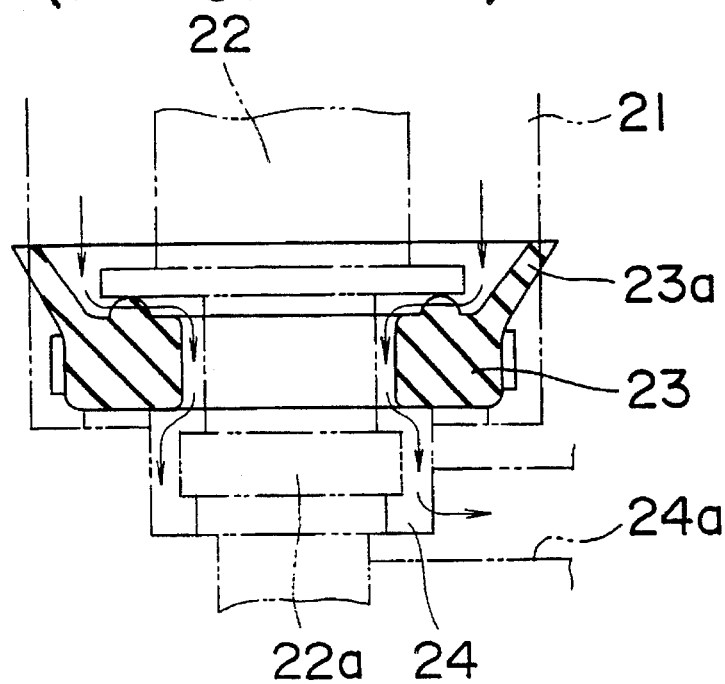
FIG. 8 is a an enlarged cross-sectional view showing the main part of the conventional proportioning valve of FIG. 7 and the flow of fluid (increasing pressure) from an input pressure chamber to an output pressure chamber and the flow of fluid (decreasing pressure) from an output pressure chamber to an input pressure chamber.
Figure 9:
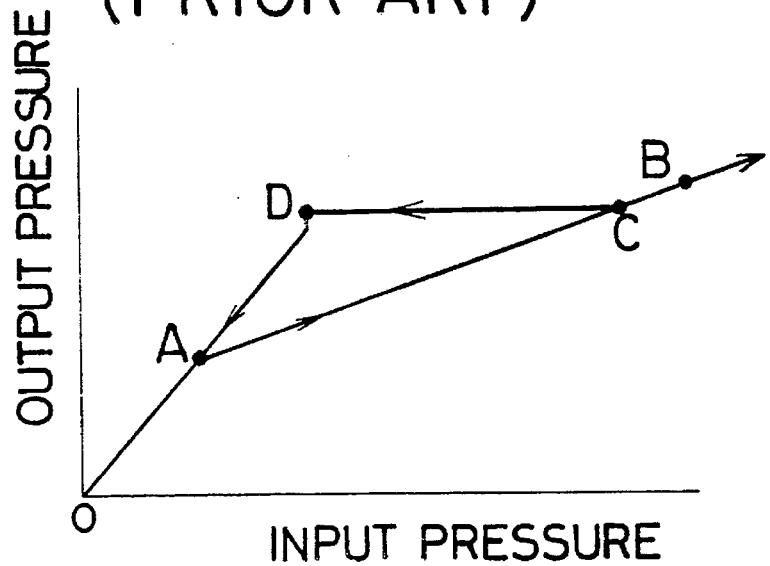
FIG. 9 is a graph showing the characteristics of the proportioning valve of FIG. 7.

Therefore, when the valve body 9a of the plunger 9 abuts against the valve seat 6 and is further pressed into the valve seat 6 as shown in FIG. 6, the snap ring 16 abuts against the free piston 3 to prevent the valve body 9a from intruding into the valve seat 6.

Still further, the proportioning valve of this embodiment has a plurality of grooves 17 formed radially on the inner end surface of the free piston 3. In the state shown in FIG. 5, the end surface of the valve body 9a is in contact with the radial ridges defined by the grooves 17.

Therefore, the communication between the input pressure chamber 10 and the output pressure chamber 11 is ensured in the state shown in FIG. 5. Also, the energizing force of the spring 12 can be born by the ridges 18, so that the load of the spring 12 on the protrusions 6c and 6d of the valve seat 6 can be reduced.

The aforesaid stop can be applied to the proportioning valve shown in FIG. 1 by fitting a snap ring onto the lower end portion of the valve body 9a of the proportioning valve shown in FIG. 1.

We claim:

1. In a proportioning valve including a valve seat disposed in a cylinder bore of a housing, a valve body disposed on a plunger in said bore engageable with said valve seat and defining an input pressure chamber and an output pressure chamber in said cylinder bore on opposite sides of said valve body, and a first spring in said input pressure chamber between said housing and said plunger for urging said plunger toward an open valve position when the pressure in said output pressure chamber is lower than a predetermined pressure to allow fluid flow between said pressure chambers, the improvement comprising:

an annular piston slidably mounted in said cylinder bore;

said valve seat being disposed on said annular piston;

a second spring installed in said output pressure chamber between said housing and said annular piston for urging said piston toward said input pressure chamber and for positioning said piston at a predetermined position, so that said valve body engages against said valve seat to close said valve and prevent fluid flow between said pressure chambers when the pressure in said input pressure chamber is increased, said piston moves toward said output pressure chamber against the force of said second spring when the pressure in said input pressure chamber is further increased, and said piston returns toward said input pressure chamber when the pressure in said input pressure chamber is decreased.

2. A proportioning valve as claimed in claim 1 and further comprising:

a stop means in said cylinder bore engageable with said annular piston to restrict the movement of said piston toward said input pressure chamber when said piston is at said predetermined position.

3. A proportioning valve as claimed in claim 1 and further comprising:

a tip end on said plunger; and stop means on said tip end of said plunger engageable with said annular piston so that when said valve body engages against said valve seat said stop means prevents said valve body from intruding into said valve seat.

4. In a proportioning valve including a valve seat disposed in a cylinder bore of a housing, a valve body disposed on a plunger in said bore engageable with said valve seat and defining an input pressure chamber and an output pressure chamber in said cylinder bore on opposite sides of said valve body, and a first spring in said input pressure chamber between said housing and said plunger for urging said plunger toward an open valve position when the pressure in said output pressure chamber is lower than a predetermined pressure to allow fluid flow between said pressure chambers, the improvement comprising:

an annular piston slidably mounted in said cylinder bore;

said valve seat being disposed on said annular piston;

a second spring installed in said output pressure chamber between said housing and said annular piston for urging said piston toward said input pressure chamber and for positioning said piston at a predetermined position, so that said valve body engages against said valve seat to close said valve and prevent fluid flow between said pressure chambers when the pressure in said input pressure chamber is increased, said piston moves toward said output pressure chamber against the force of said second spring when the pressure in said input pressure chamber is further increased, and said piston returns toward said input pressure chamber when the pressure in said input pressure chamber is decreased;

a first retainer between one end of said second spring and said annular piston;

a second retainer between the other end of said second spring and said housing; and means for connecting said retainers in fixed spaced relationship with respect to each other with said second spring therebetween.

* * * * *